Figure 1:
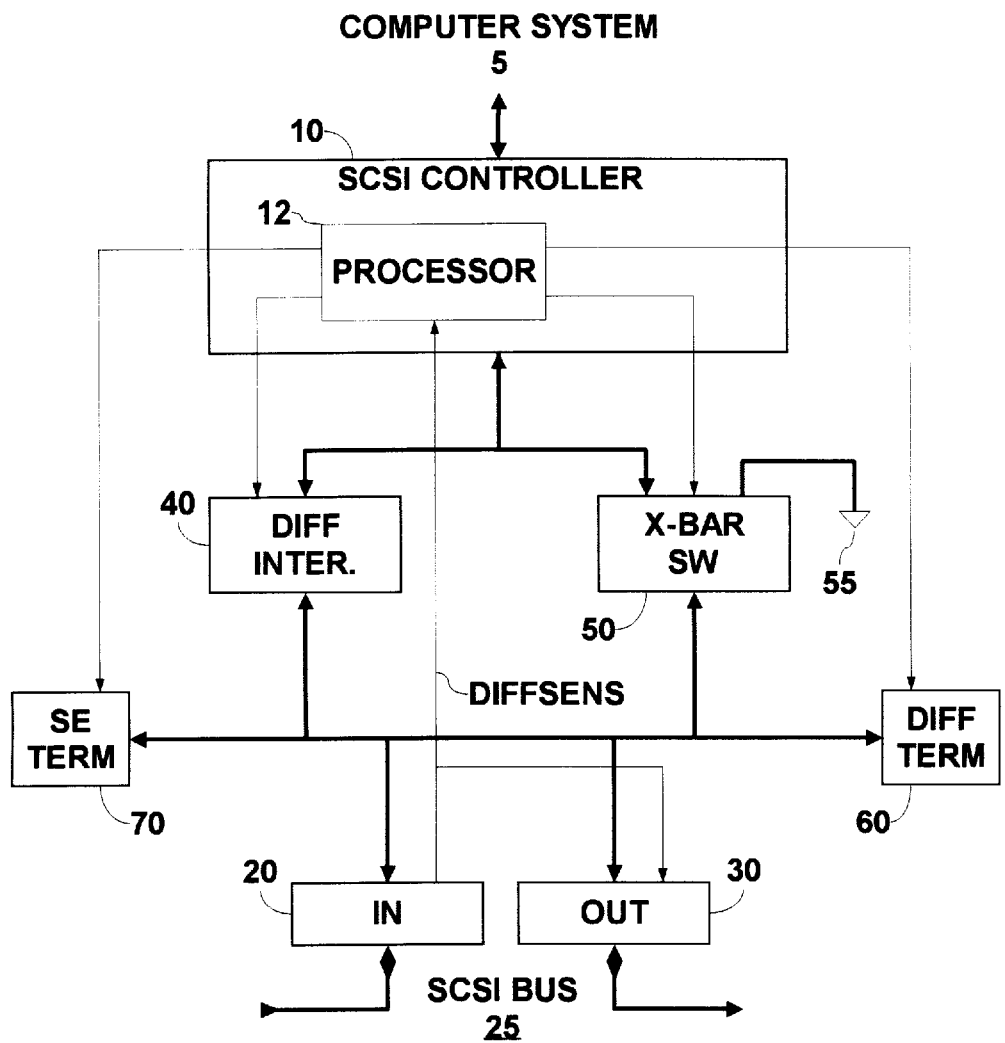

United States Patent

Zani et al.

[11] Patent Number: 5,864,715
[45] Date of Patent: Jan. 26, 1999

[54] SYSTEM FOR AUTOMATICALLY TERMINATING A DAISY-CHAIN PERIPHERAL BUS WITH EITHER SINGLE-ENDED OR DIFFERENTIAL TERMINATION NETWORK DEPENDING ON PERIPHERAL BUS SIGNALS AND PERIPHERAL DEVICE INTERFACES

[75] Inventors: Mark Zani, Derry, N.H.; Charles Loewy; Thomas Georgens, both of Upton, Mass.

[73] Assignee: EMC Corporation, Hopkinton, Mass.

[21] Appl. No.: 668,556

[22] Filed: Jun. 21, 1996

[51] Int. Cl.[6] ............................. G06F 13/10; G06F 13/40
[52] U.S. Cl. ........................ 395/883; 395/882; 395/280; 326/30
[58] Field of Search ...................... 395/309, 500, 395/283, 750.06, 750.07, 883, 882, 280; 178/63 R; 307/147; 326/30

[56] References Cited

U.S. PATENT DOCUMENTS

| | | | |
|---|---|---|---|
| 4,633,392 | 12/1986 | Vincent et al. | 395/284 |
| 4,864,291 | 9/1989 | Korpi | 340/825.5 |
| 5,099,137 | 3/1992 | Lattin, Jr. | 307/147 |
| 5,120,909 | 6/1992 | Kutz et al. | 178/63 R |
| 5,220,286 | 6/1993 | Nadeem | 330/9 |
| 5,243,623 | 9/1993 | Murdock | 375/220 |
| 5,264,958 | 11/1993 | Johnson | 395/309 |
| 5,309,569 | 5/1994 | Warchol | 395/306 |
| 5,371,892 | 12/1994 | Peterson et al. | 395/651 |
| 5,379,405 | 1/1995 | Ostrowski | 395/500 |
| 5,381,034 | 1/1995 | Thrower et al. | 257/529 |
| 5,524,236 | 6/1996 | Ostrowski | 395/500 |
| 5,564,024 | 10/1996 | Pemberton | 395/283 |
| 5,596,757 | 1/1997 | Smith | 395/750.06 |
| 5,603,039 | 2/1997 | Strevey | 395/750.07 |
| 5,671,376 | 9/1997 | Bucher et al. | 395/309 |

*Primary Examiner*—Le Hien Luu
*Attorney, Agent, or Firm*—David N. Caracappa

[57] ABSTRACT

A peripheral device interface is coupled between a computer system bus and a peripheral bus. The peripheral device bus includes a signal line which can be configured in either a single-ended or a differential configuration. A peripheral controller is coupled to the computer system bus. A single-ended signal line interface circuit is coupled between the peripheral bus signal line and the peripheral controller, and may be selectively enabled in response to a control signal. A differential signal line interface circuit is also coupled between the peripheral bus signal line and the peripheral controller and also may be selectively enabled in response to a control signal. The peripheral controller generates the control signals for the single-ended signal line interface circuit and the differential signal line interface circuit. Those control signals enable the single-ended signal line interface circuit when the peripheral bus signal line is a single-ended signal line and enable the differential signal line interface circuit when the peripheral bus signal line is a differential signal line.

11 Claims, 1 Drawing Sheet

SYSTEM FOR AUTOMATICALLY TERMINATING A DAISY-CHAIN PERIPHERAL BUS WITH EITHER SINGLE-ENDED OR DIFFERENTIAL TERMINATION NETWORK DEPENDING ON PERIPHERAL BUS SIGNALS AND PERIPHERAL DEVICE INTERFACES

The present invention relates to a peripheral device interface for a computer system which can automatically configure itself for connection to a peripheral bus. More specifically, the peripheral device interface can configure itself to a bus using one of either a single-ended or differential signal line configuration.

Current computer systems often provide access to peripheral devices via a small computer system interface (SCSI) bus. Peripheral devices, such as disk drives, tape drives, and other peripheral devices, are coupled to the SCSI bus, and the computer system includes a SCSI bus interface coupled between the computer system and the SCSI bus. The SCSI bus comprises eighteen signals for: addressing peripheral devices coupled to the SCSI bus; transferring data between an addressed peripheral device and the computer system, and synchronizing and controlling the interactions of the computer system and the peripheral devices. As is well known, the standards defining the implementation and operation of the SCSI bus permit the signals in the SCSI bus to be carried by either single-ended signal lines consisting of a signal carrying wire and a corresponding ground wire, or differential signal lines consisting of a corresponding pair of wires carrying respective differential signals. Some computer systems and peripheral devices use single-ended signal lines, and some use differential signal lines, in their SCSI bus. In addition, it is known that peripheral devices are coupled to the SCSI bus in a daisy chain configuration. In one implementation, each peripheral device has two SCSI bus connectors, one coupled to a preceding device on the SCSI bus, and the other coupled to a succeeding device. In another implementation a single SCSI bus connector is coupled to the SCSI bus. In order to prevent signal degradation due to reflections on the signal lines, each end of the daisy-chain SCSI bus is normally terminated with appropriate termination networks. As is also well known, the termination networks for single-ended signal lines are different from those for differential signal lines.

The differing signal line configurations for SCSI bus signal lines (single-ended and differential) has led to the requirement for manufacturers of SCSI interfaces to manufacture and stock SCSI interfaces in each of single-ended and differential configurations. This increases the cost of manufacturing, and increases inventory. In addition, when it becomes necessary to change a SCSI bus configuration, it is required to send a customer engineer to determine the configuration of the new SCSI bus, and ensure that the proper SCSI bus interface is installed in the computer system. Furthermore, the requirement for proper termination networks on the ends of the SCSI bus has also required that either multiple versions of SCSI interfaces, with or without terminations in each of the single-ended and differential signal line configurations, be manufactured and inventoried, or that a customer engineer be dispatched to ensure that a new SCSI interface is properly selected and configured to operate on the computer system on which it is installed.

A SCSI interface is desirable which will automatically detect the signal line configuration of a SCSI bus to which it is connected, and automatically reconfigure it's circuitry to connect properly to that bus, and to automatically enable the proper termination network or disable any termination network if it is not required. Such a SCSI interface will eliminate the requirement to manufacture and inventory different SCSI interfaces with different signal line and/or termination configurations. This will decrease the cost for manufacturing SCSI interfaces, and will obviate the requirement for a customer engineer to install or replace a SCSI interface.

In accordance with principles of the present invention a peripheral device interface is coupled between a computer system bus and a peripheral bus. The peripheral bus includes a signal line which can be configured in either a single-ended or a differential configuration. A peripheral controller is coupled to the computer system bus. A single-ended signal line interface circuit is coupled between the peripheral bus signal line and the peripheral controller, and may be selectively enabled in response to a control signal. A differential signal line interface circuit is also coupled between the peripheral bus signal line and the peripheral controller, and also may be selectively enabled in response to a control signal. The peripheral controller generates the control signals for the single-ended signal line interface circuit and the differential signal line interface circuit. Those control signals enable the single-ended signal line interface circuit when the peripheral bus signal line is a single-ended signal line and enable the differential signal line interface circuit when the peripheral bus signal line is a differential signal line.

In the drawing:

FIG. 1 is a block diagram of a peripheral controller according to the present invention.

FIG. 1 illustrates a small computer system interface (SCSI) system for coupling a host computer system 5 to a SCSI bus 25. In FIG. 1, multiple signal lines, such as those carrying SCSI bus signals, are represented by thicker lines, and signal lines carrying a single signal are represented by thinner signal lines. In FIG. 1, a SCSI controller 10, which may be any of a number of such circuits, for example an SYM 53C720 manufactured by Sybios Logic, Inc., is bidirectionally coupled to the system bus of a computer system 5. A bidirectional SCSI signal terminal of the SCSI controller 10 is coupled in common to respective first bidirectional terminals of a differential line interface 40, which may be any of a number of such circuits, for example a 75 ALS 170 and 75 ALS 171, manufactured by Texas Instruments, Inc., and a crossbar switch 50. The crossbar switch 50 may be any of a number of such circuits, for example, an SN 74 CBT 16211 manufactured by Texas Instruments, Inc. Respective second bidirectional terminals of the differential line interface 40 and the crossbar switch 50 are coupled in common to a SCSI bus input connector 20 and a SCSI bus output connector 30. A third terminal of the crossbar switch 50 is coupled to a source 55 of a reference potential (ground). The SCSI controller 10 further includes a processor 12, which controls the functions of the SCSI controller 10, and other components on the SCSI interface. The differential line interface 40 and the crossbar switch 50 are both controllable in response to respective control signals supplied from the processor 12 in the SCSI controller 10 to control input terminals of the differential line interface 40 and the crossbar switch 50.

The SCSI bus input connector 20 is coupled directly to the SCSI bus output connector 30, and the SCSI interface illustrated in FIG. 1 operates as a tap on the SCSI bus 25. This permits daisy chain connection of peripheral devices on the SCSI bus 25. A differential termination network 60, and a single-ended termination network 70 are both coupled to the SCSI bus 25 via the SCSI bus input connector 20 and SCSI bus output connector 30. The differential termination network 60 and single-ended termination network 70 are also controllable in response to respective control signals supplied from the processor 12 in the SCSI controller 10 to corresponding control input terminals of the differential termination network 60 and the single-ended termination network 70. The differential termination network 60 may be, for example, a DS 1208; and the single-ended termination network 70 may be, for example, a DS 1207A, both manufactured by Dallas Semiconductor, Inc.

As is known, one of the signals in the SCSI bus 25 is a signal (DIFFSENS) indicative of whether the SCSI bus is operating in a single-ended or differential mode. The DIFFSENS signal is illustrated separately on FIG. 1 and is received from the signal lines coupling the SCSI bus input connector 20 and the SCSI bus output terminal 30. The DIFFSENS signal is coupled to an input terminals of the processor 12 in the SCSI controller 10.

In operation, the SCSI controller 10, under control of the processor 12, receives and produces single-ended SCSI bus signals which may be coupled directly to the SCSI bus 25 when that bus is operating in the single-ended configuration. The state of the signal from the DIFFSENS line from the SCSI bus 25 is sensed by the processor 12 in the SCSI controller 10. When the signal on the DIFFSENS line is not active (e.g a logic '0' signal), this indicates that the SCSI bus 25 is operating in the single-ended configuration. In this configuration, the eighteen signals on the SCSI bus 25 are carried on signal lines arranged in pairs with a first line in the pair carrying the corresponding signal and the other line in the pair carrying a reference potential (ground) signal. In response to the DIFFSENS line being inactive, the processor 12 in the SCSI controller 10 generates a control signal for the differential interface 40 causing it to electrically isolate itself from the interface. Simultaneously, the processor 12 in the SCSI controller 10 generates a control signal for the cross-bar switch 50 causing it to couple the signal carrying lines on the SCSI bus 25 to the appropriate input terminals of the SCSI controller 10, and the ground signal carrying lines on the SCSI bus 25 to the source 55 of ground potential. The SCSI controller 10 may then operate to interconnect the system bus of the computer system 5 with the SCSI bus 25 in a known manner.

When the signal on the DIFFSENS line is active (e.g. a logic '1' signal), this indicates that the SCSI bus 25 is in the differential signal line configuration. In this configuration, the eighteen signals on the SCSI bus 25 are carried on signal lines arranged in pairs, with each pair of lines operating in a differential mode in a known manner. The processor 12 in the SCSI controller 10 generates a control signal for the crossbar switch 50 causing it to isolate the SCSI bus interface signals at the SCSI bus input connector 20 and the SCSI bus output connector 30 from the SCSI controller 10 and the ground connector 55. Simultaneously, the processor 12 in the SCSI controller 10 generates a control signal for the differential line interface 40 causing it to become operative. In this mode, the differential line interface 40 receives differential signals from associated pairs of signal lines in the SCSI bus 25, and generates a corresponding single-ended signal which may be processed by the SCSI controller 10. Correspondingly, the differential line interface 40 receives single-ended signals from the SCSI controller 10 and generates corresponding differential signals which are supplied to an associated pair of signal lines on the SCSI bus 25.

The processor 12 in the SCSI controller 10 is also capable of determining whether it's SCSI interface is on the end of the chain of interfaces on the SCSI bus 25 by detecting the presence or absence of a SCSI bus 25 connector in the SCSI bus input connector 20 or SCSI bus output connector 30, respectively, in a known manner. That is, if no SCSI bus 25 connector is inserted in the SCSI bus input connector 20, this interface is one end of the daisy chain SCSI bus 25. If no SCSI bus 25 connector is inserted in the SCSI bus output connector 30, this interface is on the other end of the daisy chain SCSI bus 25.

The presence or absence of a connector in the SCSI bus input connector 20 or the SCSI bus output connector 30 may be detected by sensing a signal having a known state on a predetermined signal line of the SCSI bus 25, in a known manner. For example, it is known that there are SCSI bus signal lines, connected to identifiable pins on the SCSI bus input and output connectors (20 and 30, respectively), which are maintained at a ground potential, whether the SCSI bus is operating in a single-ended or differential configuration. One of these lines is selected to test for the presence or absence of a SCSI bus 25 connector in the SCSI bus input connector 20. A pull-up resistor, connected to a source of operating potential, is connected to that line at the SCSI bus input connector 20. If a SCSI bus 25 connector is inserted into the SCSI bus input connector 20, the signal at that line has the ground potential, and if no SCSI bus 25 connector is inserted into the SCSI bus input terminal 20, the signal at that line has the operating potential. A different one of these lines is selected to test for the presence or absence of a SCSI bus 25 connector in the SCSI bus output connector 30. A pull-up resistor, connected to a source of operating potential, is connected to the other line at the SCSI bus output connector 30. If a SCSI bus 25 connector is inserted into the SCSI bus output connector 30, the signal at that line has the ground potential, and if no SCSI bus 25 connector is inserted into the SCSI bus output terminal 30, the signal at that line has the operating potential.

Alternatively, the presence of absence of a connector in a bus connector may be detected by determining the impedance of a pin on the SCSI bus connector. A high impedance indicates that no wire is attached to that pin and, thus, no connector is inserted into the bus connector; a lower impedance indicates that a wire coupled to other circuitry is attached to that pin and, thus, a connector is inserted into the bus connector.

If the processor 12 in the SCSI controller 10 determines that its interface is on an end of the daisy chain SCSI bus 25, it provides respective control signals to the termination networks (60 and 70). If the DIFFSENS signal is inactive, indicating that the SCSI bus is operating in the single-ended configuration, then the control signal to the single-ended termination network 70 conditions it to couple itself to the SCSI bus 25 via either the SCSI bus input connector 20 or the SCSI bus output connector 30. Simultaneously, the control signal to the differential termination network 60 conditions it to electrically isolate itself from the SCSI bus 25. If the DIFFSENS signal is active, indicating that the SCSI bus is operating in the differential configuration, then the control signal to the differential termination network 60 conditions it to couple itself to the SCSI bus 25 via either the SCSI bus input connector 20 or the SCSI bus output connector 30. Simultaneously, the control signal to the single-ended termination network 70 conditions it to electrically isolate itself from the SCSI bus 25.

In this manner, the SCSI interface automatically configures itself to couple the correct termination network to the SCSI bus 25 only when it is appropriate, thus, avoiding over termination of the SCSI bus 25, and obviating the requirement for a customer engineer to visit the computer system site to properly install or disable termination networks.

What is claimed is:

1. A peripheral device interface, coupled between a computer system bus and a daisy-chain peripheral bus serially coupling a first peripheral device interface, a plurality of intermediate peripheral device interfaces, and a last peripheral device interface and including a signal line being one in of a single-ended and a differential configuration; the interface comprising:

a peripheral controller, coupled to the computer system bus;

a single-ended termination network, coupled to the peripheral bus, and being selectively enabled responsive to a control signal;

a differential termination network, coupled to the peripheral bus, and being selectively enabled responsive to a control signal; and a detector, coupled to the peripheral bus, to detect if the interface is one of the first peripheral device interface and the last peripheral device interface on the daisy-chain bus; wherein:

the peripheral controller generates respective control signals for the single-ended termination network and the differential termination network for enabling the single ended termination network when the peripheral bus signal line is a single-ended signal line and the interface is one of the first peripheral device interface and the last peripheral device interface on the daisy-chain bus, and for enabling the differential termination network when the peripheral bus signal line is a differential signal line and the interface is one of the first peripheral device interface and the last peripheral device interface on the daisy-chain bus.

2. The interface of claim 1, wherein:

the peripheral bus includes a signal indicating the configuration of the peripheral bus signal line; and the peripheral controller comprises a processor, responsive to the configuration indicative signal from the peripheral bus and generating the control signal for the single-ended termination network when the configuration indicative signal indicates that the peripheral bus signal line is in the single-ended configuration and the interface is one of the first peripheral device interface and the last peripheral device interface on the daisy-chain bus, and the control signal for the differential termination network when the configuration indicative signal indicates that the peripheral bus signal line is in the differential configuration and the interface is one of the first peripheral device interface and the last peripheral device interface on the daisy-chain bus.

3. In a computer system including: a computer system bus, a daisy-chain peripheral bus serially coupling a first peripheral device interface, a plurality of intermediate peripheral device interfaces, and a last peripheral device interface, and including a signal line being in one of a single-ended and a differential configuration, and a peripheral device interface including a peripheral controller coupled to the computer system bus, a single-ended termination network coupled to the peripheral bus and selectively enabled, and a differential termination network coupled to the peripheral bus and selectively enabled, a method for operating the peripheral device interface, comprising the steps of:

detecting the configuration of the peripheral bus signal line;

detecting whether the peripheral device interface is one of the first peripheral device interface and the last peripheral device interface on the daisy-chain bus;

enabling the single-ended termination network if the peripheral device interface is one of the first peripheral device interface and the last peripheral device interface on the daisy-chain bus, and the peripheral bus signal line is in the single-ended configuration; and enabling the differential termination network if the peripheral device interface is one of the first peripheral device interface and the last peripheral device interface on the daisy-chain bus, and the peripheral bus signal line is in the differential configuration.

4. The method of claim 3 wherein the single-ended termination network is selectively enabled responsive to a control signal and the differential termination network is selectively enabled responsive to a control signal, and the step of enabling the single-ended termination network comprises the step of conditioning the peripheral controller to generate the control signal for the single-ended termination network if the peripheral signal line is in the single-ended configuration and the peripheral device interface is one of the first peripheral device interface and the last peripheral device interface on the daisy-chain bus; and the step of enabling the differential signal line interface circuit comprises the step of conditioning the peripheral controller to generate the control signal for the differential signal line interface circuit if the peripheral signal line is in the differential configuration and the peripheral device interface is one of the first peripheral device interface and the last peripheral device interface on the daisy-chain bus.

5. The method of claim 4 wherein the peripheral bus further includes a line carrying a signal indicating the configuration of the peripheral bus signal line; and the step of enabling the single-ended termination network further comprises the step of generating the control signal for the single-ended termination network when the configuration indicative signal indicates that the peripheral bus signal line is in the single-ended configuration and the peripheral device interface is one of the first peripheral device interface and the last peripheral device interface on the daisy-chain bus; and the step of enabling the differential termination network further comprises the step of generating the control signal for the differential termination network when the configuration indicative signal indicates that the peripheral bus signal line is in the differential configuration and the peripheral device interface is one of the first peripheral device interface and the last peripheral device interface on the daisy-chain bus.

6. A peripheral device interface, coupled between a computer system bus and a daisy-chain peripheral bus serially coupling a first peripheral device interface, a plurality of intermediate peripheral device interfaces, and a last peripheral device interface and including a signal line being one in of a single-ended and a differential configuration; the interface comprising:

a peripheral controller, coupled to the computer system bus;

a single-ended signal line interface circuit, coupled between the peripheral bus signal line and the peripheral controller, and being selectively enabled responsive to a control signal; and a differential signal line interface circuit, coupled between the peripheral bus signal line and the peripheral controller, and being selectively enabled responsive to a control signal;

a single-ended termination network, coupled to the peripheral bus, and being selectively enabled responsive to a control signal;

a differential termination network, coupled to the peripheral bus, and being selectively enabled responsive to a control signal; and a detector, coupled to the peripheral bus, to detect if the interface is one of the first peripheral device interface and the last peripheral device interface on the daisy-chain bus; wherein:

the peripheral controller generates respective control signals for the single-ended signal line interface circuit and the differential signal line interface circuit for enabling the single-ended signal line interface circuit when the peripheral bus signal line is in a single-ended configuration and enabling the differential signal line interface circuit when the peripheral bus signal line is in a differential configuration, and for the single-ended termination network and the differential termination network for enabling the single ended termination network when the peripheral bus signal line is a single-ended signal line and the interface is one of the first peripheral device interface and the last peripheral device interface on the daisy-chain bus, and for enabling the differential termination network when the peripheral bus signal line is a differential signal line and the interface is one of the first peripheral device interface and the last peripheral device interface on the daisy-chain bus.

7. The interface of claim 6, wherein:

the peripheral bus includes a signal indicating the configuration of the peripheral bus signal line; and the peripheral controller comprises a processor, responsive to the configuration indicative signal from the peripheral bus and generating the control signal for the single-ended termination network when the configuration indicative signal indicates that the peripheral bus signal line is in the single-ended configuration and the interface is one of the first peripheral device interface and the last peripheral device interface on the daisy-chain bus, and the control signal for the differential termination network when the configuration indicative signal indicates that the peripheral bus signal line is in the differential configuration and the interface is one of the first peripheral device interface and the last peripheral device interface on the daisy-chain bus.

8. The interface of claim 7 wherein the processor further generates the control signal for the single-ended signal line interface circuit when the configuration indicative signal indicates that the peripheral bus is in the single-ended configuration, and the control signal from the differential signal line interface circuit when the configuration indicative signal indicates that the peripheral bus is in the differential configuration.

9. In a computer system including: a computer system bus, a daisy-chain peripheral bus serially coupling a first peripheral device interface, a plurality of intermediate peripheral device interfaces, and a last peripheral device interface, and including a signal line being in one of a single-ended and a differential configuration, a peripheral device interface including a peripheral controller coupled to the computer system bus, a single-ended signal line interface circuit coupled between the peripheral bus signal line and the peripheral controller and being selectively enabled, a differential signal line interface circuit coupled between the peripheral bus signal line and the peripheral controller and being selectively enabled, a single-ended termination network coupled to the peripheral bus and selectively enabled, and a differential termination network coupled to the peripheral bus and selectively enabled, a method for operating the peripheral device interface, comprising the steps of:

detecting the configuration of the peripheral bus signal line; and enabling the single-ended signal line interface circuit if the peripheral bus signal line is in the single-ended configuration; and enabling the differential signal line interface circuit if the peripheral bus signal line is in the differential configuration;

detecting whether the peripheral device interface is one of the first peripheral device interface and the last peripheral device interface on the daisy-chain bus; and enabling the single-ended termination network if the peripheral device interface is one of the first peripheral device interface and the last peripheral device interface on the daisy-chain bus, and the peripheral bus signal line is in the single-ended configuration; and enabling the differential termination network if the peripheral device interface is one of the first peripheral device interface and the last peripheral device interface on the daisy-chain bus, and the peripheral bus signal line is in the differential configuration.

10. The method of claim 9 wherein the single-ended termination network is selectively enabled responsive to a control signal and the differential termination network is selectively enabled responsive to a control signal, and the step of enabling the single-ended termination network comprises the step of conditioning the peripheral controller to generate the control signal for the single-ended termination network if the peripheral signal line is in the single-ended configuration and the peripheral device interface is one of the first peripheral device interface and the last peripheral device interface on the daisy-chain bus; and the step of enabling the differential termination network comprises the step of conditioning the peripheral controller to generate the control signal for the differential termination network if the peripheral signal line is in the differential configuration and the peripheral device interface is one of the first peripheral device interface and the last peripheral device interface on the daisy-chain bus.

11. The method of claim 10 wherein the peripheral bus further includes a line carrying a signal indicating the configuration of the peripheral bus signal line; and the step of enabling the single-ended termination network further comprises the step of generating the control signal for the single-ended termination network when the configuration indicative signal indicates that the peripheral bus signal line is in the single-ended configuration and the peripheral device interface is one of the first peripheral device interface and the last peripheral device interface on the daisy-chain bus; and the step of enabling the differential termination network further comprises the step of generating the control signal for the differential termination network when the configuration indicative signal indicates that the peripheral bus signal line is in the differential configuration and the peripheral device interface is one of the first peripheral device interface and the last peripheral device interface on the daisy-chain bus.

* * * * *